United States Patent
Hellyer et al.

(10) Patent No.: US 12,418,495 B1
(45) Date of Patent: Sep. 16, 2025

(54) MODIFICATION OF A CUSTOM RESOURCE MANAGED BY AN OPERATOR IN AN ORCHESTRATION PLATFORM

(71) Applicant: International Business Machines Corporation, Armonk, NY (US)

(72) Inventors: Howard James Hellyer, South Wonston (GB); Daniel Joseph Vaccaro-Senna, Basingstoke (GB); Thomas James Waterton, Southampton (GB); Richard Pilot, Bishopstoke (GB)

(73) Assignee: International Business Machines Corporation, Armonk, NY (US)

( * ) Notice: Subject to any disclaimer, the term of this patent is extended or adjusted under 35 U.S.C. 154(b) by 26 days.

(21) Appl. No.: 18/606,006

(22) Filed: Mar. 15, 2024

(30) Foreign Application Priority Data

Feb. 14, 2024 (GB) .................................. 2402031

(51) Int. Cl.
*G06F 15/16* (2006.01)
*H04L 47/70* (2022.01)
*H04L 47/76* (2022.01)

(52) U.S. Cl.
CPC .............. *H04L 47/76* (2013.01); *H04L 47/82* (2013.01)

(58) Field of Classification Search
CPC .............................. H04L 41/12; H04W 40/02
USPC ........................................................ 709/226
See application file for complete search history.

(56) References Cited

U.S. PATENT DOCUMENTS

| | | | |
|---|---|---|---|
| 10,911,558 B1 | 2/2021 | Witzel | |
| 11,792,071 B1 * | 10/2023 | Nadeem | H04L 63/20 709/220 |
| 11,966,723 B2 * | 4/2024 | Stefanov | G06F 9/45558 |
| 12,013,757 B2 * | 6/2024 | Raz | G06F 11/1417 |
| 12,101,204 B2 * | 9/2024 | Miriyala | H04L 41/122 |
| 12,153,934 B2 * | 11/2024 | Dockter | G06F 9/4416 |

(Continued)

FOREIGN PATENT DOCUMENTS

JP 2022165503 A 11/2022

OTHER PUBLICATIONS

"Admission Controllers Reference", Kubernetes, downloaded from the Internet Feb. 15, 2024, <https://kubernetes.io/docs/reference/access-authn-authz/admission-controllers/>, 12 pages.

(Continued)

*Primary Examiner* — Moustafa M Meky
(74) *Attorney, Agent, or Firm* — Michael A. Petrocelli

(57) ABSTRACT

An approach for modification of a custom resource in an orchestration platform. One step provides a modification custom resource definition for updating one or more fields in a custom resource. Another step inserts a modification intermediary between a managing operator of the custom resource and an orchestration application programming interface (API) server including restarting a deployment of the managing operator to update pods of the deployment to connect to the modification intermediary when receiving a request for the custom resource. Another step intercepts, by the modification intermediary, requests for the custom resource between the operator and the orchestration API server and modifies the custom resource by applying an update to the request according to the modification custom resource whilst hiding the update from the operator.

20 Claims, 7 Drawing Sheets

(56) References Cited

U.S. PATENT DOCUMENTS

| | | | |
|---|---|---|---|
| 12,159,176 B2* | 12/2024 | Mariappan | G06F 9/547 |
| 12,242,895 B2* | 3/2025 | Pan | G06F 9/5083 |
| 2022/0114003 A1 | 4/2022 | Okman et al. | |
| 2022/0156129 A1 | 5/2022 | Li | |
| 2022/0300386 A1 | 9/2022 | Auch | |
| 2023/0009930 A1 | 1/2023 | Wang | |
| 2023/0101973 A1* | 3/2023 | Mariappan | G06F 9/547 |
| | | | 719/328 |
| 2023/0104568 A1* | 4/2023 | Miriyala | H04L 45/42 |
| | | | 718/104 |
| 2023/0126045 A1* | 4/2023 | Pan | G06F 9/542 |
| | | | 718/104 |
| 2023/0161647 A1 | 5/2023 | Thoemmes et al. | |
| 2023/0176839 A1* | 6/2023 | Stefanov | G06F 8/61 |
| | | | 717/140 |
| 2023/0289228 A1* | 9/2023 | Chintha | G06F 9/5061 |
| 2023/0385140 A1 | 11/2023 | Burgazzoli et al. | |
| 2023/0409369 A1* | 12/2023 | Liu | H04L 41/0895 |
| 2024/0004686 A1 | 1/2024 | Brezak | |
| 2024/0129161 A1* | 4/2024 | Miriyala | H04L 41/122 |
| 2024/0143446 A1* | 5/2024 | Raz | G06N 20/00 |
| 2024/0205094 A1* | 6/2024 | Rodriguez-Natal | H04L 45/64 |
| 2025/0016029 A1* | 1/2025 | Miriyala | H04L 45/66 |

OTHER PUBLICATIONS

GB Search Report for Application No. GB2402031.5, mailed Aug. 9, 2024, 3 pages.

Hellyer et al., "Modification of a Custom Resource Managed By an Operator in an Orchestration Platform", Application No. 2402031.5, filed Feb. 14, 2024, 25 pages.

International Searching Authority, "Notification of Transmittal of the International Search Report and the Written Opinion of the International Searching Authority, or Declaration," Patent Cooperation Treaty Apr. 29, 2025, 14 pages, International Application No.—PCT/ EP2025/050265.

Kubernetes, "Using RBAC Authorization", May 2, 2025, 22 pages, https://kubernetes.io/docs/reference/access-authn-authz/rbac/.

* cited by examiner

MODIFICATION OF A CUSTOM RESOURCE MANAGED BY AN OPERATOR IN AN ORCHESTRATION PLATFORM

BACKGROUND

The present invention relates to orchestration platforms, and more specifically, to modification of a custom resource managed by an operator in an orchestration platform.

Orchestration platform operators reconcile the custom resources they manage back to their expected state. Accordingly, it can be hard to apply ad-hoc fixes to fix serviceability issues. If an administration or service engineer changes a custom resource, the operator will typically change it back. In order to make a change permanent it is usually necessary to change the operator itself. This may mean building, packaging, testing and distributing a new version of the operator.

Providing a new version is problematic as it can take a long time to work through all the steps of building a new version and any change to fix one customer's issue must be fully tested to ensure it does not cause any issues on other customer systems when they apply the update.

The problem may arise in any orchestration platform that makes use of the "operator pattern" that is widely used. The Kubernetes (Kubernetes is a trademark of Linux Foundation) orchestration platform is used as an example; however, the problem and the described solution apply more broadly to other orchestration platforms.

A simple example would be an operator that creates a Persistent VolumeClaim (PVC) with a particular hardcoded storage class that is not present on the customer's cluster. Even though a suitable storage class may be available, if the PVC is modified to use that storage class, the operator will modify it back, typically within seconds. To make the storage class configurable, the maintainers of the operator would need to add a field to the Kubernetes Custom Resource Definition (CRD) for their resource, that will necessitate going through the whole update process for the operator, building and distributing a new version. They will also need to make sure that this value now defaults to the current choice of storage class, so they do not break any other users.

The operator itself may be managed by another operator, for example, by the catalog of operators that exist on Red Hat OpenShift, so even changing the operator image with a fix may be undone by yet another operator.

It is also impractical to make every field in every managed resource configured by an operator available in the operand CRD as that would potentially be very large and defeat the purpose of the operator, which may well be maintaining consistency across different resources it creates (for example, creating a config map and passing the name of that config map as a volume to a deployment) making manual modification error prone and undesirable.

Being unable to modify managed resources in live systems is a major problem for teams servicing products. Teams often cannot even make trivial changes to configuration as the orchestration operator managing those resources will immediately revert the changes. At present, the only way to make a manual modification persist is to scale the operator that is managing it down to zero. However, that removes the ability to create, delete or modify the resources that operator manages and prevent it from performing its regular job. This removes most of the utility of having operators. In a multi-tenant system, this would prevent one customer from creating new instances of a CRD when another customer needed the operator scaled down to allow for a manual modification.

SUMMARY

According to an embodiment of the present invention, a computer-implemented method for modification of a custom resource in an orchestration platform, the computer-implemented method comprising: providing a modification custom resource definition for updating one or more fields in a custom resource; inserting a modification intermediary between a managing operator of the custom resource and an orchestration application programming interface (API) server including restarting a deployment of the managing operator to update pods of the deployment to connect to the modification intermediary when receiving a request for the custom resource; intercepting by the modification intermediary requests for the custom resource between the operator and the orchestration API server; and modifying the custom resource by applying an update to the request according to the modification custom resource whilst hiding the update from the operator.

According to another embodiment of the present invention, a system for modification of a custom resource in an orchestration platform, the system comprising: a processor and a computer-readable storage media coupled to the processor, wherein the computer-readable storage media contains program instructions, executed by the processor, comprising: a modification defining component to provide a modification custom resource definition for updating one or more fields in a custom resource; an intermediary inserting component to insert a modification intermediary between a managing operator of the custom resource and an orchestration application programming interface (API) server including a restarting component for restarting a deployment of the managing operator to update pods of the deployment to connect to the modification intermediary when receiving a request for the custom resource; and a request intercepting component to intercept requests, by the modification intermediary, for the custom resource between the operator and the orchestration API server, wherein the modification intermediary includes a modifying component for modifying the custom resource by applying an update to the request according to the modification custom resource while hiding the update from the operator.

According to another embodiment of the present invention, a computer program product for modification of a custom resource in an orchestration platform, the computer program product comprising: one or more computer readable storage media having computer-readable program instructions stored on the one or more computer readable storage media, said program instructions executes a computer-implemented method comprising: providing a modification custom resource definition for updating one or more fields in a custom resource; inserting a modification intermediary between a managing operator of the custom resource and an orchestration application programming interface (API) server including restarting a deployment of the managing operator to update pods of the deployment to connect to the modification intermediary when receiving a request for the custom resource; intercepting by the modification intermediary requests for the custom resource between the operator and the orchestration API server; and modifying the custom resource by applying an update to the request according to the modification custom resource whilst hiding the update from the operator.

BRIEF DESCRIPTION OF THE DRAWINGS

Embodiments of the present invention will now be described, by way of example only, with reference to the accompanying drawings.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numbers may be repeated among the figures to indicate corresponding or analogous features.

DETAILED DESCRIPTION

The described method and system provide a modification of a custom resource in a container orchestration platform when the custom resource is sent between the orchestration operator that manages the custom resource and an orchestration application programming interface (API) server. A modification intermediary is inserted between the orchestration operator that manages the custom resource and the orchestration API server to intercept a custom resource and to modify defined fields in the custom resource.

A container orchestration API is known to be extended using custom resources, which represent objects that are not part of a standard installation. These custom resources may be declared using Custom Resource Definitions (CRDs) as a type of resource that can be dynamically registered and unregistered without shutting down or restarting a cluster that is currently running. Custom controllers are another known extension mechanism that interacts with the orchestration API. A custom controller may interact with a custom resource to allow for a declarative API in which users may declare the desired state via the custom resource and the custom controller observes the change and reconciles it. The combination of custom resources and custom controllers is referred to as an "operator." A use case of an operator is to capture an aim for managing a service or set of services and to implement them using automation with a declarative API supporting this automation.

The described method and system extend the use of custom resources to include modification custom resources and associated functionality to provide the advantage of being able to modify managed custom resources in live systems for teams servicing products. The method and system may override configuration in a custom resource that is managed by an operator within the orchestration platform.

The described method and system may be applied to any orchestration platform that makes use of the "operator pattern." Kubernetes orchestration platform is used as an example; however, the method and system may apply more broadly to other orchestration platforms.

As a point of clarity, custom resources created by operators will usually contain a "managed-by" annotation. Therefore, a custom resource managed by an operator is one that the operator created and not a resource that it monitors as an input that was created by a user (that is generally referred to as an "operand").

Figure 1:
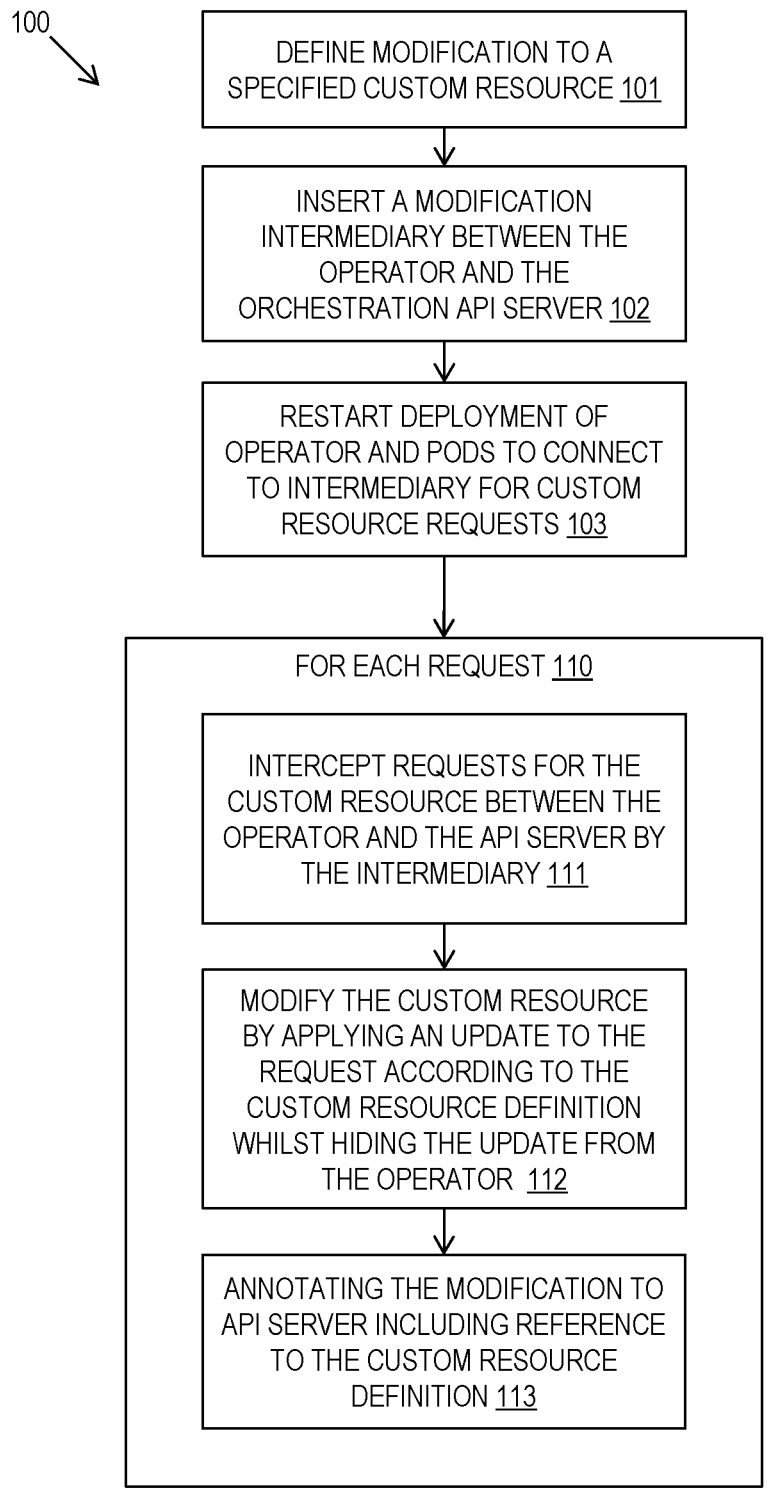
FIG. 1 is a flow diagram of an example embodiment of a method in accordance with embodiments of the present invention.

Referring to FIG. 1, a flow diagram 100 shows an example embodiment of the described method.

The method includes defining 101 a modification custom resource for intercepting an exchange between an operator and an orchestration API server in the orchestration platform to update one or more fields of a custom resource according to the defined modification. The modification may be, for example, to fix an identified bug or problem with the custom resource in a live system. The modification custom resource may include an actual state modification for outgoing requests to the orchestration API server and a reported state modification to reverse the outbound modification when returning to the operator.

The method inserts 102 a modification intermediary between a managing operator of the custom resource and an orchestration API server. The modification intermediary may be in the form of a service and deployment that is connected to when a request for the custom resource is intercepted. Inserting the modification intermediary includes restarting 103 a deployment of the managing operator to update pods of the deployment to connect to the modification intermediary.

The above 101-103 are a one-time set up process and for each request 110 the following is carried out.

The method may intercept 111 by the intermediary requests for the custom resource between the operator and the orchestration API server. The intermediary may modify 112 the custom resource going to the orchestration API server by applying an update to the request according to the custom resource modification whilst hiding the update from the operator.

The method may include annotating 113 the modification in the custom resource going to the orchestration API server including a reference to the custom resource definition.

The method provides the ability to consistently modify custom resources in a live system without causing the managing operator either to modify them back or to see that the resource is not as expected and move the top-level resource to an error state or to error internally.

The method is carried out within an orchestration system in a way that is consistent with how the orchestration system works already and the flow of object status between the orchestration API server and the operator managing the custom resource.

The method may also show an administrator that a custom resource modification is being applied.

A modification may be as simple as just changing part of the reported status. For example, the reported status may be modified from "ready" to "READY" to work round a simple case sensitivity bug. In another example, the modification may be much more complicated such as disabling the creation of some resources, replacing them with other types, and modifying what is reported to make it appear as if resources were created as expected. A further example may be automatically labeling resources for monitoring, such as billing use cases when an operator's created resources do not conform to an organization's standard for these purposes.

The described method makes use of existing fine-grained security controls within the orchestration system so that only appropriate users associated with specific roles, (such as system administrators who already have the capability to create/modify custom resources) would be able to use this functionality. Orchestration role-based access control may be used to limit which users may create the modification custom resources to a limited set of administrators.

The method addresses the problem with workloads running on orchestration platforms where some configuration properties need to be changed but conventionally cannot be changed because other operators would reset any changes made.

The method is an improvement in the technical field of computer updates in live systems generally and more particularly in the technical field of updates to resources in a container orchestration system.

Figure 2:
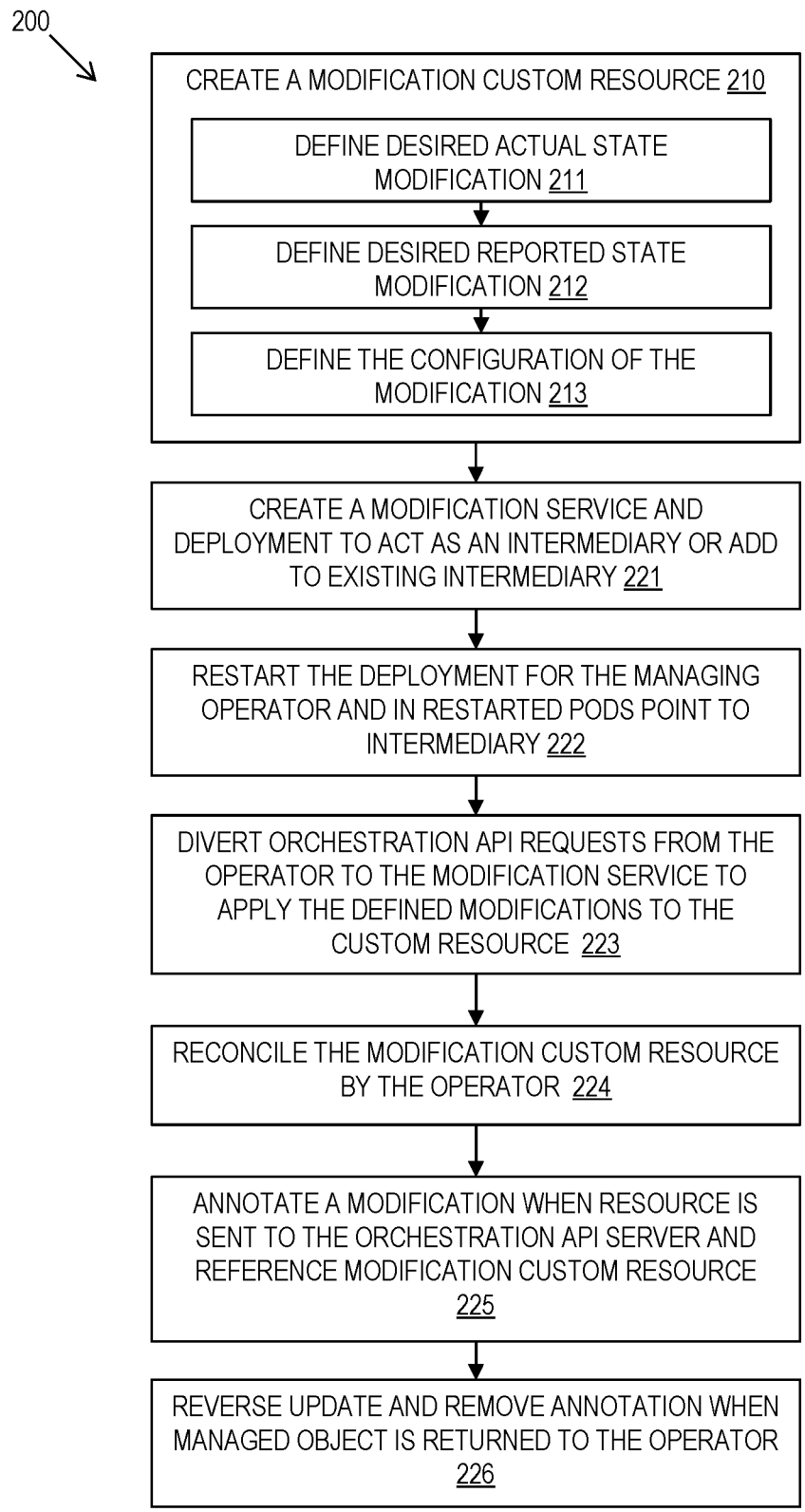
FIG. 2 is a flow diagram of another example embodiment of a method in accordance with embodiments of the present invention.

FIG. 2 shows a flow diagram 200 of an example embodiment of the described method providing further details of the method carried by an operator to create a modification custom resource and to reconcile the modification custom resource using a modification intermediary.

The method may create 210 a modification custom resource including a name of the deployment for the operator of the custom resource and a name of the custom resource to be modified. The name of the deployment for the operator of the custom resource may be, for example, the name of its input operand or labels, etc. that can be used to uniquely identify the managing service.

A modification custom resource may be created when a human user, such as a support engineer, identifies that a custom resource managed by an operator is the cause of a problem. The support engineer is unable to reconfigure (or remove/replace) this custom resource by changing any setting available in the resource that acts as the operand for that operator. As the support engineer can identify what should be changed in the managed resource and can confirm with the developers of the operator that changing this will not cause another issue, they create a modification custom resource.

Creating 210 the modification custom resource includes the following aspects.

The creating 210 may include defining 211 the desired actual state modification for each managed resource. The desired actual state is the version of the resource given to the orchestration platform. This does not need to be the entire desired resource state; the modification may be a difference applied to one field within the resource. For example, only one or more of the "spec:", "labels:", or "annotations:" section of the resource may be modified. Generally, status would not be modified in the desired state that refers to current state of the resource, as status is not set when the custom resource is created, it is reported by the operator managing that resource.

The creating 210 may include defining 212 the desired reported state modification. The desired reported state is the spoofed state which the interceptor passes back to the operator so that the operator is not aware of the actual state in the orchestration platform and so does not attempt to overwrite the modification. This may be a modification to the resource to reverse the outbound modification. An example of the type of information most likely to be altered for the desired reported state is the "status:" section of the custom resource. For example, the status may be "ready", which would be automatically determined by the system and fed back to the user rather than a change the user is explicitly making.

The creating 210 may include defining 213 the configuration for these states as provided by the service team or development to the customer to deploy on their system. An example may be a vendor's service or development team may advise a customer to override the status returned by a resource and may provide the modification custom resource that should be applied. The representation of the resource modifications is implementation dependent. In a Kubernetes platform, a logical choice of representation may be a JSON-Path (JavaScript Object Notation Path, JavaScript is a trademark of Oracle Corporation) expression since the Kubernetes API objects may be represented in JSON. Alternatively, the representation may include scripts to execute in another suitable language such as JavaScript or Python (Python is a trademark of Python Software Foundation).

The method creates 221 a modification service and deployment to act as a modification intermediary between the operator and the orchestration API server for the modification custom resource. When there is already a modification intermediary for the operator being intercepted, the modification custom resource is added to the list of modifications that the intermediary applies.

There are alternative methods of implementing the modification intermediary. For example, one modification intermediary may be provided for the whole orchestration instance that keeps track of which resources belong to which operators; alternatively, there may be one modification intermediary per operator.

Once the intermediary is ready, the method may restart 222 the deployment for the managing operator and in the restarted pod(s) may replace the environment variables that give the orchestration API connection details (e.g. KUBERNETES_SERVICE_HOST) with different values that point the intermediary service the method has started.

Once the operator's deployed pods have restarted and orchestration API requests are being diverted 223 by the intermediary, the modification service of the intermediary can apply the requested modifications to the managed resource.

The modifications service operator reconciles 224 the modification custom resource.

The method may annotate 225 a modification when the custom resource is sent to the orchestration API server, including a reference to the modification custom resource.

The method may reverse 226 the update of the modification and remove the annotation when the managed object is returned to the operator.

Figure 3:
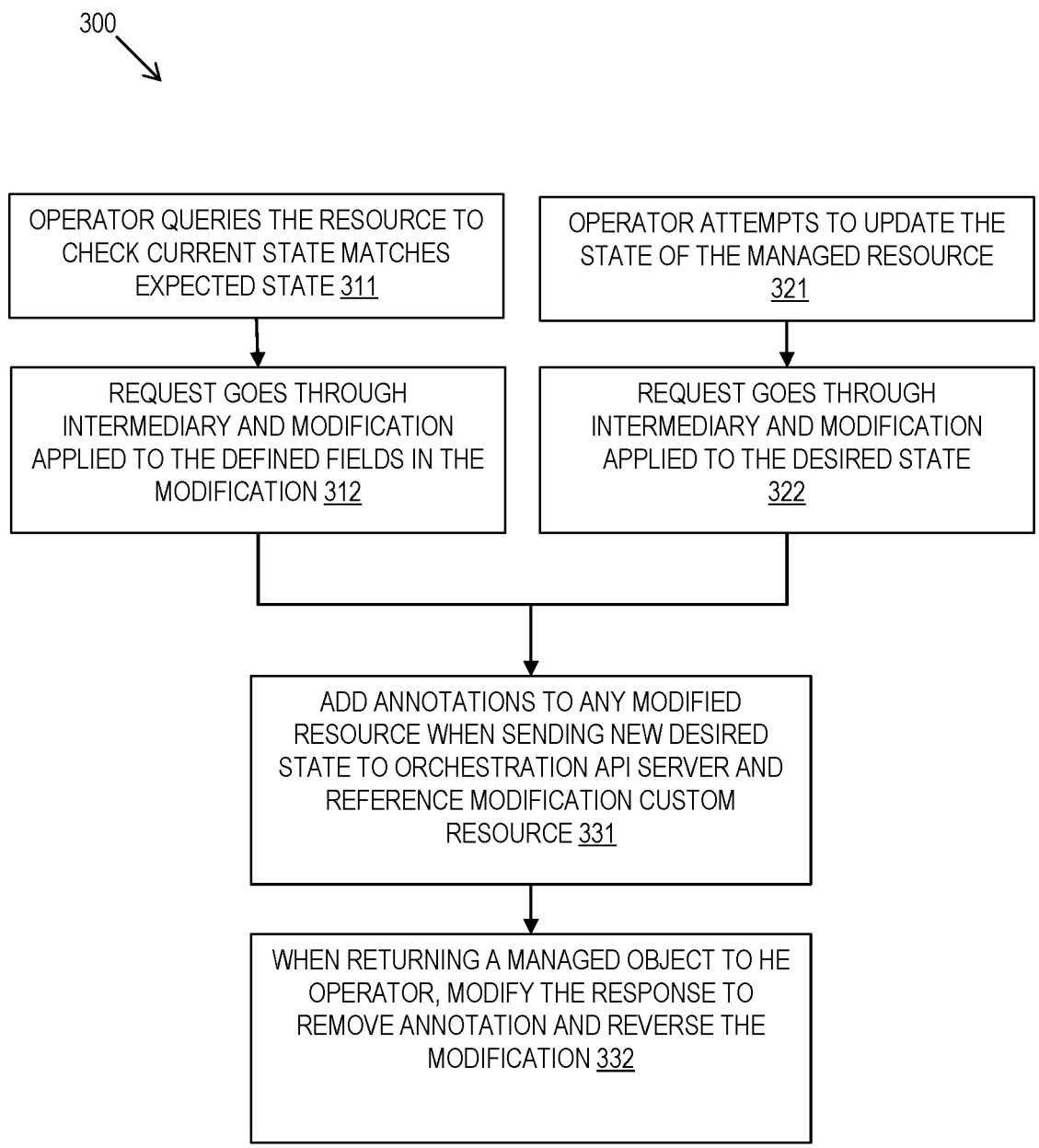
FIG. 3 is a flow diagram of an example embodiment of an aspect of the method in accordance with embodiments of the present invention.

Referring to FIG. 3, the flow diagram 300 shows an example embodiment of the modification processes.

When the restarted operator queries 311 the custom resource to check whether its current state matches its expected state, the request goes through 312 the modification intermediary service for that operator and the modification is applied. Only the fields specified in the modification within the identified resource are changed. Any other difference either in that custom resource or any other custom resource that is not subject to modification will be reconciled normally, i.e., it will pass through the intermediary unchanged in both directions. In this way the state is reported to the operator and the change is hidden from the operator.

When the restarted operator attempts to update 321 the state of the custom resource, then the modifications to that desired state are applied 322 by the modification intermediary service and the resulting object is passed to the orchestration API server.

On any resource that the modification operator is modifying when it sends a new desired state to the orchestration API server, it adds 331 an annotation or label to indicate it is doing so and references the modification custom resource that triggered the modification. When it returns 332 a managed object to the operator this label is always removed in the reported state (which includes the reversed modifications).

A user querying any object that is modified by the modification operator (e.g., via kubectl) can see the annotations indicating that the object's state is being modified when sent between its owning operator and the orchestration system so that these operations are hidden only from the managing operator and not anyone trying to manage or debug the system.

Figure 4A:
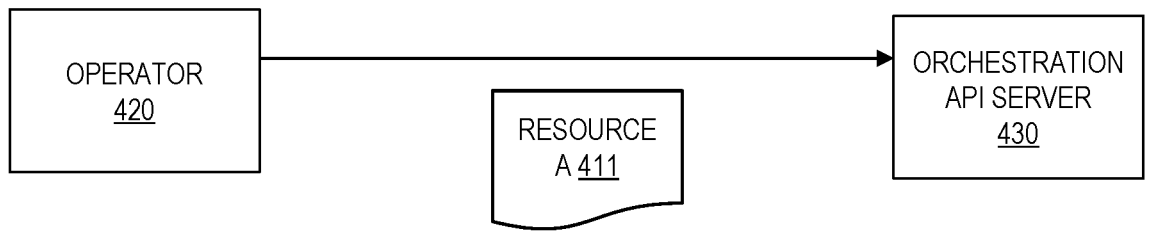
FIGS. 4A to 4D are schematic diagrams illustrating an example embodiment of the described method.

Referring to FIGS. 4A to 4D, schematic diagrams illustrate the modification of a custom resource. FIG. 4A shows a custom resource A 411 between a managing operator 420 of the custom resource A 411 and an orchestration API server 430. The operator 420 creates the custom resource A 411 and passes it to the orchestration API server 430.

Figure 4B:
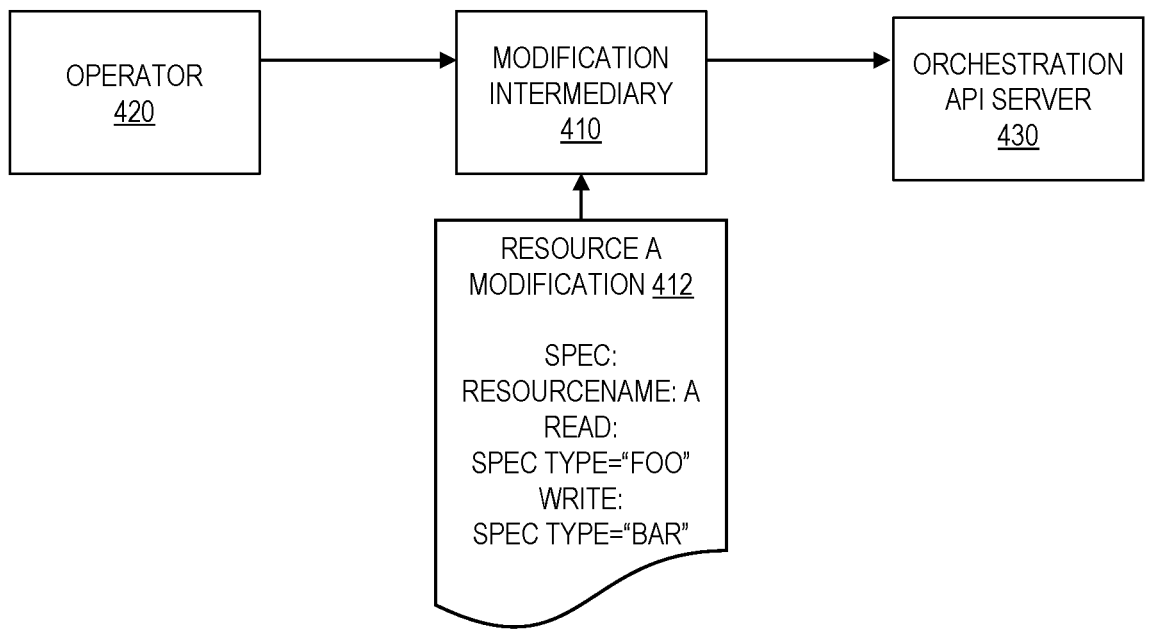

FIG. 4B shows a modification custom resource definition. The method inserts a modification intermediary 410 between the operator 420 and the orchestration API server 430. The user submits a modification to a specified custom resource 412 that includes the definition of spec: resourcename: A, read: spec type="foo", write: spec type="bar".

Figure 4C:
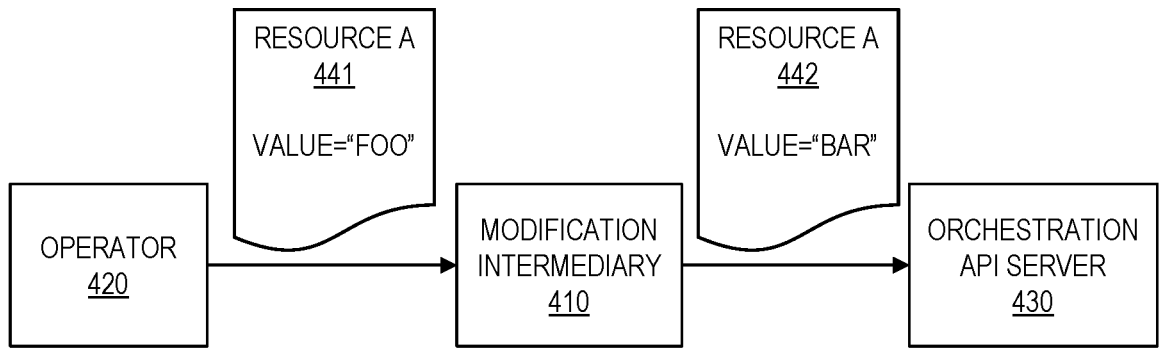

FIG. 4C shows the operator 420 creating a resource 441 and passing it to the modification intermediary 410 which applies the modification to the specified resource 442. In this example, the created resource 441 includes the value="foo" and the modification intermediary 410 updates this according to the defined modification custom resource 412 to value="bar" when sending it to the orchestration API server 430.

Figure 4D:
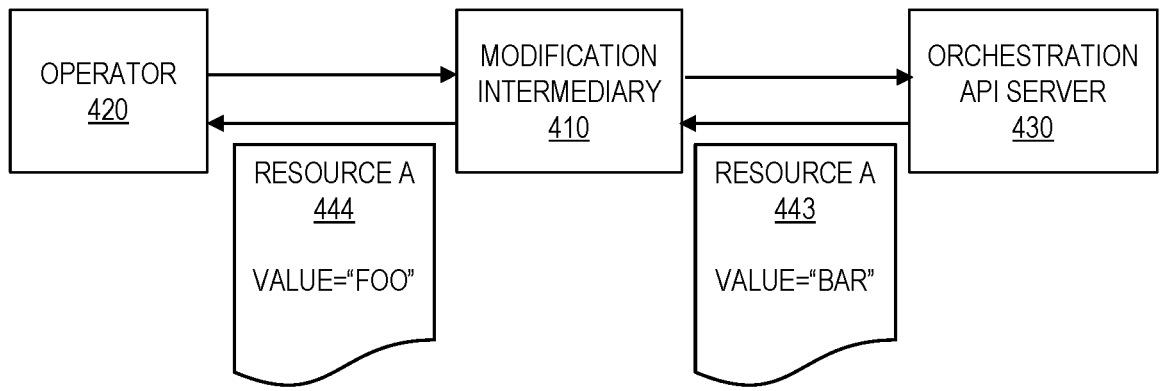

FIG. 4D shows the operator 420 retrieving the specified resource A and the modification intermediary 410 fetches the resource from the orchestration API server 430. The returned resource 443 includes value="bar" which is reversed by the modification intermediary 410 to hide the modification and the reverse-modified object 444 is sent to the operator 420 with value="foo".

Figure 5:
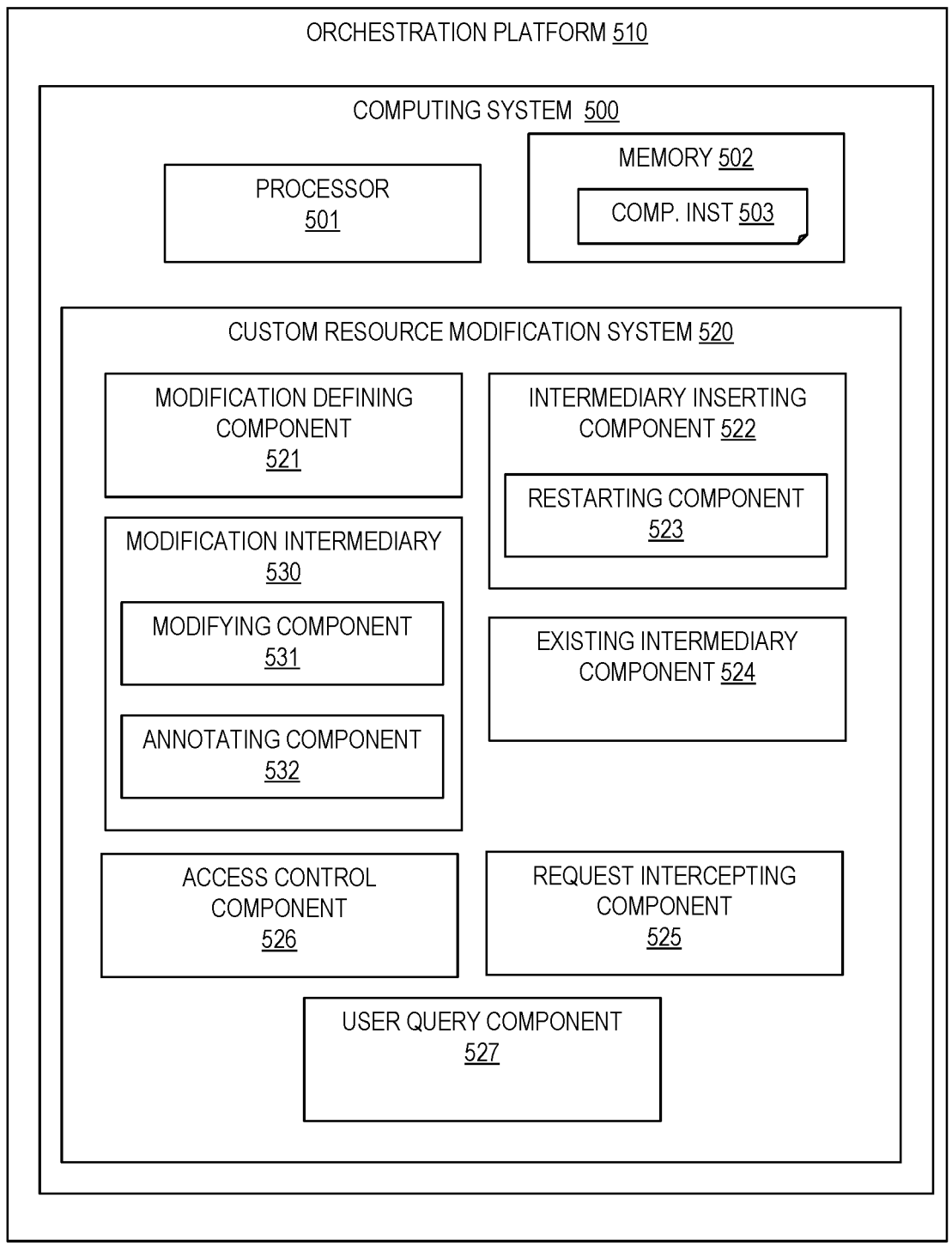
FIG. 5 is a block diagram of an example embodiment of a system in accordance with embodiments of the present invention.

Referring to FIG. 5, a block diagram shows a computing system 500 in which the described custom resource modification system 520 may be implemented. The computing system 500 may form part of an orchestration platform 510 and may include at least one processor 501, a hardware module, or a circuit for executing the functions of the described components which may be software units executing on the at least one processor. Multiple processors running parallel processing threads may be provided enabling parallel processing of some or all of the functions of the components. Memory 502 may be configured to provide computer instructions 503 to the at least one processor 501 to carry out the functionality of the components.

The custom resource modification system 520 may include a modification defining component 521 for providing a modification custom resource definition for updating one or more fields in a custom resource. The modification defining component 521 may define an actual state modification for outgoing requests to the orchestration API server and a reported state modification to reverse the outbound modification when returning to the operator.

The custom resource modification system 520 may include an intermediary inserting component 522 for inserting a modification intermediary 530 between a managing operator of the custom resource and an orchestration application programming interface (API) server. The intermediary inserting component 522 may include a restarting component 523 for restarting a deployment of the managing operator to update pods of the deployment to connect to the modification intermediary when receiving a request for the custom resource. The restarting component 523 may replace environment variables that give the orchestration API connection details with different values that point the modification intermediary.

The custom resource modification system 520 may include an existing intermediary component 524 for, when a modification intermediary exists for the operator, adding the modification custom resource to the list of modifications that the intermediary applies.

The modification intermediary 530 may be in the form of a service and deployment that is connected to by operator deployment pods when a request for the custom resource is intercepted.

The modification intermediary 530 includes a modifying component 531 for modifying the custom resource by applying an update to the request according to the custom resource definition while hiding the update from the operator.

The modification intermediary 530 may include an annotating component 532 for annotating the custom resource when sending the custom resource to the orchestration API server to indicate the modification and referencing the modification custom resource.

The custom resource modification system 520 may include a request intercepting component 525 for intercepting, by the modification intermediary, requests for the custom resource between the operator and the orchestration API server and diverting them to the modification intermediary 530.

The custom resource modification system 520 may include an access control component 526 for applying orchestration role-based access control to limit which users are permitted to provide the modification custom resource.

The custom resource modification system 520 may include a user query component 527 for receiving a user query of any object that is modified by the modification intermediary and showing annotations indicating that the object's state has been modified when sent between the operator and the orchestration API server.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a provided flowchart. For example, depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Figure 6:
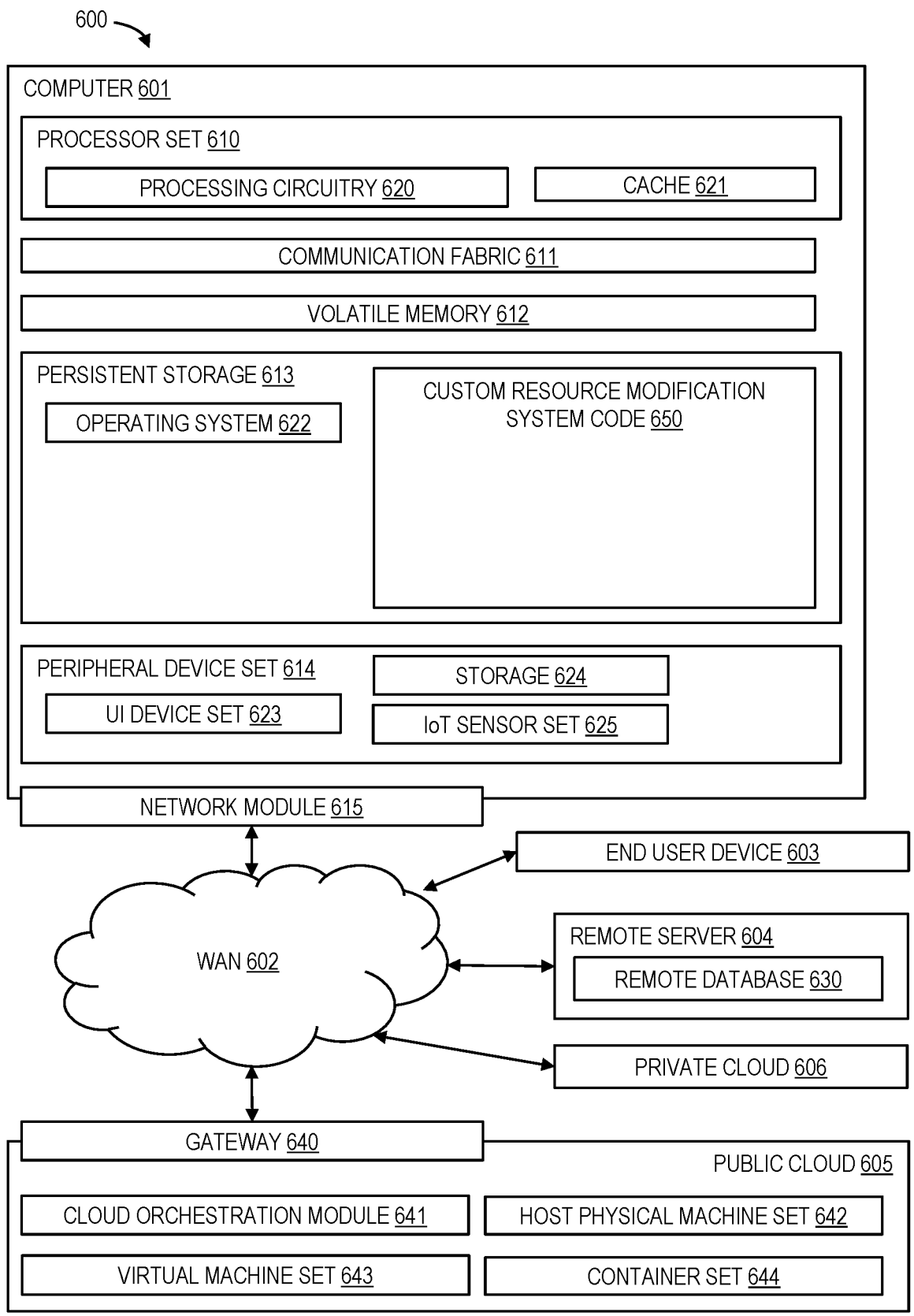
FIG. 6 is a block diagram of an example embodiment of a computing environment for the execution of at least some of the computer code involved in performing the present invention.

Referring to FIG. 6, computing environment 600 contains an example of an environment for the execution of at least some of the computer code involved in performing the inventive methods, such as custom resource modification system code 650. In addition to block 650, computing environment 600 includes, for example, computer 601, wide area network (WAN) 602, end user device (EUD) 603, remote server 604, public cloud 605, and private cloud 606. In this embodiment, computer 601 includes processor set 610 (including processing circuitry 620 and cache 621), communication fabric 611, volatile memory 612, persistent storage 613 (including operating system 622 and block 650, as identified above), peripheral device set 614 (including user interface (UI) device set 623, storage 624, and Internet of Things (IoT) sensor set 625), and network module 615. Remote server 604 includes remote database 630. Public cloud 605 includes gateway 640, cloud orchestration module 641, host physical machine set 642, virtual machine set 643, and container set 644.

COMPUTER 601 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 630. As is well understood in the art of computer technology, and depending upon the technology, performance of a computer-implemented method may be distributed among multiple computers and/or between multiple locations. On the other hand, in this presentation of computing environment 600, detailed discussion is focused on a single computer, specifically computer 601, to keep the presentation as simple as possible. Computer 601 may be located in a cloud, even though it is not shown in a cloud in FIG. 6. On the other hand, computer 601 is not required to be in a cloud except to any extent as may be affirmatively indicated.

PROCESSOR SET 610 includes one, or more, computer processors of any type now known or to be developed in the future. Processing circuitry 620 may be distributed over multiple packages, for example, multiple, coordinated integrated circuit chips. Processing circuitry 620 may implement multiple processor threads and/or multiple processor cores. Cache 621 is memory that is located in the processor chip package(s) and is typically used for data or code that should be available for rapid access by the threads or cores running on processor set 610. Cache memories are typically organized into multiple levels depending upon relative proximity to the processing circuitry. Alternatively, some, or all, of the cache for the processor set may be located "off chip." In some computing environments, processor set 610 may be designed for working with qubits and performing quantum computing.

Computer readable program instructions are typically loaded onto computer 601 to cause a series of operational steps to be performed by processor set 610 of computer 601 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 621 and the other storage media discussed below. The program instructions, and associated data, are accessed by processor set 610 to control and direct performance of the inventive methods. In computing environment 600, at least some of the instructions for performing the inventive methods may be stored in block 650 in persistent storage 613.

COMMUNICATION FABRIC 611 is the signal conduction path that allows the various components of computer 601 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 612 is any type of volatile memory now known or to be developed in the future. Examples include dynamic type random access memory (RAM) or static type RAM. Typically, volatile memory 612 is characterized by random access, but this is not required unless affirmatively indicated. In computer 601, the volatile memory 612 is located in a single package and is internal to computer 601, but, alternatively or additionally, the volatile memory may be distributed over multiple packages and/or located externally with respect to computer 601.

PERSISTENT STORAGE 613 is any form of non-volatile storage for computers that is now known or to be developed in the future. The non-volatility of this storage means that the stored data is maintained regardless of whether power is being supplied to computer 601 and/or directly to persistent storage 613. Persistent storage 613 may be a read only memory (ROM), but typically at least a portion of the persistent storage allows writing of data, deletion of data and re-writing of data. Some familiar forms of persistent storage include magnetic disks and solid state storage devices. Operating system 622 may take several forms, such as various known proprietary operating systems or open source Portable Operating System Interface-type operating systems that employ a kernel. The code included in block 650 typically includes at least some of the computer code involved in performing the inventive methods.

PERIPHERAL DEVICE SET 614 includes the set of peripheral devices of computer 601. Data communication connections between the peripheral devices and the other components of computer 601 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 623 may include components such as a display screen, speaker, microphone, wearable devices (such as goggles and smart watches), keyboard, mouse, printer, touchpad, game controllers, and haptic devices. Storage 624 is external storage, such as an external hard drive, or insertable storage, such as an SD card. Storage 624 may be persistent and/or volatile. In some embodiments, storage 624 may take the form of a quantum computing storage device for storing data in the form of qubits. In embodiments where computer 601 is required to have a large amount of storage (for example, where computer 601 locally stores and manages a large database) then this storage may be provided by peripheral storage devices designed for storing very large amounts of data, such as a storage area network (SAN) that is shared by multiple, geographically distributed computers. IoT sensor set 625 is made up of sensors that can be used in Internet of Things applications. For example, one sensor may be a thermometer and another sensor may be a motion detector.

NETWORK MODULE 615 is the collection of computer software, hardware, and firmware that allows computer 601 to communicate with other computers through WAN 602. Network module 615 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 615 are performed on the same physical hardware device. In other embodiments (for example, embodiments that utilize software-defined networking (SDN)), the control functions and the forwarding functions of network module 615 are performed on physically separate devices, such that the control functions manage several different network hardware devices. Computer readable program instructions for performing the inventive methods can typically be downloaded to computer 601 from an external computer or external storage device through a network adapter card or network interface included in network module 615.

WAN 602 is any wide area network (for example, the internet) capable of communicating computer data over non-local distances by any technology for communicating computer data, now known or to be developed in the future. In some embodiments, the WAN 602 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 603 is any computer system that is used and controlled by an end user (for example, a customer of an enterprise that operates computer 601), and may take any of the forms discussed above in connection with computer 601. EUD 603 typically receives helpful and useful data from the operations of computer 601. For example, in a hypothetical case where computer 601 is designed to provide a recommendation to an end user, this recommendation would typically be communicated from network module 615 of computer 601 through WAN 602 to EUD 603. In this way, EUD 603 can display, or otherwise present, the recommendation to an end user. In some embodiments, EUD 603 may be a client device, such as thin client, heavy client, mainframe computer, desktop computer and so on.

REMOTE SERVER 604 is any computer system that serves at least some data and/or functionality to computer 601. Remote server 604 may be controlled and used by the same entity that operates computer 601. Remote server 604 represents the machine(s) that collect and store helpful and useful data for use by other computers, such as computer 601. For example, in a hypothetical case where computer 601 is designed and programmed to provide a recommendation based on historical data, then this historical data may be provided to computer 601 from remote database 630 of remote server 604.

PUBLIC CLOUD 605 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 605 is performed by the computer hardware and/or software of cloud orchestration module 641. The computing resources provided by public cloud 605 are typically implemented by virtual computing environments that run on various computers making up the computers of host physical machine set 642, which is the universe of physical computers in and/or available to public cloud 605. The virtual computing environments (VCEs) typically take the form of virtual machines from virtual machine set 643 and/or containers from container set 644. It is understood that these VCEs may be stored as images and may be transferred among and between the various physical machine hosts, either as images or after instantiation of the VCE. Cloud orchestration module 641 manages the transfer and storage of images, deploys new instantiations of VCEs and manages active instantiations of VCE deployments. Gateway 640 is the collection of computer software, hardware, and firmware that allows public cloud 605 to communicate through WAN 602.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 606 is similar to public cloud 605, except that the computing resources are only available for use by a single enterprise. While private cloud 606 is depicted as being in communication with WAN 602, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 605 and private cloud 606 are both part of a larger hybrid cloud.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Improvements and modifications can be made to the foregoing without departing from the scope of the present invention.

What is claimed is:

1. A computer-implemented method for modification of a custom resource in an orchestration platform, the computer-implemented method comprising:
    providing a modification custom resource definition for updating one or more fields in a custom resource;
    inserting a modification intermediary between a managing operator of the custom resource and an orchestration application programming interface (API) server including restarting a deployment of the managing operator to update pods of the deployment to connect to the modification intermediary when receiving a request for the custom resource;
    intercepting by the modification intermediary requests for the custom resource between the operator and the orchestration API server; and
    modifying the custom resource by applying an update to the request according to the modification custom resource whilst hiding the update from the operator.

2. The computer-implemented method of claim 1, wherein the modification custom resource definition includes an actual state modification for outgoing requests to the orchestration API server and a reported state modification to reverse an outbound modification when returning to the operator.

3. The computer-implemented method of claim 1, further comprising:
    annotating the custom resource when sending to the orchestration API server to indicate the modification and referencing the modification custom resource.

4. The computer-implemented method of claim 1, wherein the modification intermediary is in the form of a service and deployment that is connected to by operator deployment pods when a request for the custom resource is intercepted.

5. The computer-implemented method of claim 1, wherein when a modification intermediary exists for the operator, adding the modification custom resource to a list of modifications that the modification intermediary applies.

6. The computer-implemented method of claim 1, wherein restarting a deployment of the managing operator to update pods of the deployment to connect to the modification intermediary replaces environment variables that give the orchestration API connection details with different values that point the modification intermediary.

7. The computer-implemented method of claim 1, further comprising:
    applying orchestration role-based access control to limit which users are permitted to provide the modification custom resource.

8. The computer-implemented method of claim 1, further comprising:
    receiving an operator query of the custom resource to check whether its current state matches its expected state; and
    diverting the request through the modification intermediary to apply the modification.

9. The computer-implemented method of claim 1, further comprising:
    receiving an operator update to a desired state of the custom resource; and
    diverting the request through the modification intermediary to apply the modification to the desired state.

10. The computer-implemented method of claim 1, further comprising:
    receiving a user query of any object that is modified by the modification intermediary and showing annotations indicating that the object's state has been modified when sent between the operator and the orchestration API server.

11. The computer-implemented method of claim 1, further comprising:
    defining a modification custom resource comprising:
        defining information for identifying the custom resource to be modified;
        defining a name of the deployment for the operator of the custom resource; and
        defining user configuration details for the modification custom resource.

12. A system for modification of a custom resource in an orchestration platform, the system comprising:
    a processor and a computer-readable storage media coupled to the processor, wherein the computer-readable storage media contains program instructions, executed by the processor, comprising:
        a modification defining component to provide a modification custom resource definition for updating one or more fields in a custom resource;
        an intermediary inserting component to insert a modification intermediary between a managing operator of the custom resource and an orchestration application programming interface (API) server including a restarting component for restarting a deployment of the managing operator to update pods of the deployment to connect to the modification intermediary when receiving a request for the custom resource; and
        a request intercepting component to intercept requests, by the modification intermediary, for the custom resource between the operator and the orchestration API server, wherein the modification intermediary includes a modifying component for modifying the custom resource by applying an update to the request according to the modification custom resource while hiding the update from the operator.

13. The system of claim 12, wherein the modification defining component defines an actual state modification for outgoing requests to the orchestration API server and a reported state modification to reverse an outbound modification when returning to the operator.

14. The system of claim 12, wherein the modification intermediary includes an annotating component for annotating the custom resource when sending to the orchestration API server to indicate the modification and referencing the modification custom resource.

15. The system of claim 12, wherein the modification intermediary is in the form of a service and deployment that is connected to by operator deployment pods when a request for the custom resource is intercepted.

16. The system of claim 12, further comprising:
including an existing intermediary component for, when a modification intermediary exists for the operator, adding the modification custom resource to a list of modifications that the existing intermediary component applies.

17. The system of claim 12, wherein the restarting component replaces environment variables that give the orchestration API connection details with different values that point the modification intermediary.

18. The system of claim 12, further comprising:
an access control component for applying orchestration role-based access control to limit which users are permitted to provide the modification custom resource.

19. The system of claim 12, further comprising:
a user query component for receiving a user query of any object that is modified by the modification intermediary and showing annotations indicating that the object's state has been modified when sent between the operator and the orchestration API server.

20. A computer program product for modification of a custom resource in an orchestration platform, the computer program product comprising:
one or more computer readable storage media having computer-readable program instructions stored on the one or more computer readable storage media, said program instructions executes a computer-implemented method comprising:
providing a modification custom resource definition for updating one or more fields in a custom resource;
inserting a modification intermediary between a managing operator of the custom resource and an orchestration application programming interface (API) server including restarting a deployment of the managing operator to update pods of the deployment to connect to the modification intermediary when receiving a request for the custom resource;
intercepting by the modification intermediary requests for the custom resource between the operator and the orchestration API server; and
modifying the custom resource by applying an update to the request according to the modification custom resource whilst hiding the update from the operator.

\* \* \* \* \*